United States Patent [19]

Baldacci

[11] Patent Number: 5,061,543

[45] Date of Patent: Oct. 29, 1991

[54] NARROW WIDTH CUSHIONING PAD PRODUCT FOR PACKAGING SMALL PARTS OR PROTECTIVE EDGES OF PRODUCTS TO BE PACKAGED

[75] Inventor: Bruno H. Baldacci, Novelty, Ohio

[73] Assignee: Ranpak Corp., Concord Township, Concord County, Ohio

[21] Appl. No.: 412,784

[22] Filed: Sep. 26, 1989

Related U.S. Application Data

[62] Division of Ser. No. 140,734, Jan. 4, 1988, Pat. No. 4,884,999.

[51] Int. Cl.[5] .......................... B32B 3/04; B31F 1/10

[52] U.S. Cl. .................................... 428/126; 428/129; 428/103; 428/164; 428/154; 428/537.5; 428/121; 428/124; 428/156; 428/152; 428/153; 428/161; 428/163; 428/167; 428/170; 428/172; 428/177; 428/176; 428/181; 428/192; 428/218; 428/219; 428/220; 428/215

[58] Field of Search ............... 428/126, 129, 103, 169, 428/154, 537.5, 121, 124, 156, 152, 153, 161, 163, 167, 170, 172, 177, 176, 181, 192, 218, 219, 220, 215

[56] References Cited

U.S. PATENT DOCUMENTS

| | | | |
|---|---|---|---|
| 1,497,189 | 6/1924 | Mitchell | 428/129 |
| 1,560,772 | 11/1925 | Fowler | 428/129 |
| 1,599,564 | 9/1926 | Fowler | 428/103 |
| 1,746,199 | 2/1930 | Merrick | 428/103 |
| 3,655,500 | 4/1972 | Johnson | 428/126 |
| 4,109,040 | 8/1978 | Ottaviano | 428/129 |
| 4,717,613 | 1/1988 | Ottaviano | 428/129 |
| 4,750,896 | 6/1988 | Komaransky et al. | 493/357 |
| 4,806,410 | 2/1989 | Armington et al. | 428/126 |

*Primary Examiner*—Ellis P. Robinson
*Assistant Examiner*—William P. Watkins, III
*Attorney, Agent, or Firm*—Calfee, Halter & Griswold

[57] ABSTRACT

A converter mechanism and method for producing a relatively narrow width and small size cushioning dunnage product of pad-like form, from sheet-like stock material. A conversion kit comprising a funnel-like chute member and a coacting elongated generally rectangular shaped (in top plan) bar former is provided for conversion of a known cushioning dunnage converter into one which can produce the relatively narrow and small size pad-like cushioning dunnage product of the invention. The bar former has its forwardmost end disposed generally adjacent the exit end of the funnel-like chute member, with its rearward end extending rearwardly of the entrance to the funnel-like chute member. The narrow width and small size dunnage product produced on the instant converter mechanism possesses a density of approximately one pound per cubic foot, and is between approximately 3½ inches to approximately 4 inches in width and approximately 1 to 1¼ inches in thickness, and is especially useful for packaging and cushioning small parts, as well as for effectively cushioning edges of products, for instance furniture or the like, during shipment thereof.

4 Claims, 4 Drawing Sheets

NARROW WIDTH CUSHIONING PAD PRODUCT FOR PACKAGING SMALL PARTS OR PROTECTIVE EDGES OF PRODUCTS TO BE PACKAGED

This is a divisional of copending application Ser. No. 07/140,734 filed on Jan. 4, 1988, now U.S. Pat. No. 4,884,999 issued Jan. 5, 1989.

This invention relates in general to dunnage converter mechanism for producing dunnage product of pad-like form from sheet-like stock material and more particularly relates to a dunnage converter for producing from sheet-like stock material, such as paper, a continuous strip of resilient, relatively narrow and small size pad-like dunnage product, which can be expeditiously used for cushioning and packaging relatively small parts, as well as for use in protecting the edges of products during shipment thereof, such as for instance the edges of furniture including the arms and legs thereof, and the like.

With this invention, known converter mechanism for producing relatively wide, pad-like cushioning dunnage product, is able to be expeditiously converted in the field into a converter mechanism of the present invention for producing relatively narrow pad-like cushioning dunnage product, and by means of the utilization of a novel conversion kit, which includes a funnel-like chute member and an elongated, bar-like former member, which is mounted in the existing converter mechanism, and which changes the size of the produced pad like cushioning dunnage product. Also the multi-ply stock roll utilized in this invention for providing the sheet-like stock material to form the cushioning dunnage product, is of a materially lesser width as compared to that used in the aforementioned known cushioning dunnage converter mechanisms, and in this connection, positioning elements are provided coacting with the lesser width stock roll, for properly maintaining the position of the lesser width stock roll on the revamped converter mechanism.

BACKGROUND OF THE INVENTION

Cushioning dunnage producing mechanism for producing a resilient pad-like cushioning dunnage product having lateral pillow like portions centrally connected as by coining and/or adhesive means, are known in the art.

U.S. Pat. No. 4,750,896 filed Oct. 28, 1985, and issued June 14, 1988, in the names of Anthony J. Komaransky and Raymond Q. Armington and entitled Method and Mechanism for Producing Cushioning Dunnage Product, discloses a cushioning dunnage converter mechanism of the general type as that to which the present invention is directed. Such prior art converter mechanism includes a funnel-like chute member which coacts with a triangular shape (in plan) forming frame, for forming the sheets of stock material for a multi-ply stock roll into rolled configuration prior to their passing into and through coacting rotatable connecting gears, which "coin" the rolled edge stock material, and produce a full or conventional size pad-like cushioning dunnage product of about 8 to 10 inches in width, having laterally arranged, resilient pillow like portions, which are connected centrally of the pad like dunnage product, running lengthwise thereof.

There are other prior art patents disclosing dunnage producing mechanism and methods for producing a resilient cushioning dunnage product of the general pad-like type of abovementioned U.S. Pat. No. 4,750,896 U.S. Pat. No. 4,026,198 to Gary W. Ottavaino dated May 31, 1977, and entitled Cushioning Dunnage Mechanism, Transfer Cart Therefor and Method, discloses a cushioning dunnage producing converter mechanism which produces a full size resilient pad like dunnage product comprising lateral, resilient, pillow-like portions connected along the central portion of the pad running lengthwise thereof, together with methods and apparatus for producing the same.

U.S. Pat. No. 3,655,500 dated Apr. 11, 1972, to G. R. Johnson and entitled A Resilient Cushioning Dunnage Product for Use in Packaging and Packing, and U.S. Pat. No. 4,109,040, dated Aug. 22, 1978, to Gary W. Ottavaino and entitled Cushioning Dunnage Product Produced from Cushioning Dunnage Mechanism, disclose full size resilient pad like dunnage products comprising lateral, resilient, pillow-like portions connected along the central portion of the pad running lengthwise thereof.

U.S. Pat. No. 4,717,613 issued Jan. 5, 1988, in the name of Gary W. Ottavaino, and entitled Mechanism and Method for Producing Cushioning Dunnage, discloses a relatively light weight cushioning dunnage product of the aforementioned resilient pad like form, but of the same general width as those aforediscussed, together with a method and apparatus for producing the same.

The prior art converter mechanisms and the full size pad like cushioning dunnage product produced thereby, are not the same as the narrow pad like cushioning dunnage product produced on a converter mechanism utilizing the conversion kit provided by the present invention. The relatively narrow and small size pad like product of this invention is more expeditiously utilizable for packaging and wrapping small parts, and may also be more appropriately utilized in certain cushioning situations wherein the larger size of cushioning dunnage pad is not conveniently utilizable or adaptable, such as for instance in protecting and cushioning sharp edges of articles, such as furniture and the like and/or for furniture leg and/or arm wrap, etc. during shipment of the articles.

SUMMARY OF THE INVENTION

The present invention provides a novel, pad like cushioning dunnage product, and method for the production thereof from sheet-like stock material, such as for instance paper, with the machine produced product comprising a relatively narrow, deformable pad like cushioning article between approximately $3\frac{1}{2}$ inches to approximately 4 inches in width, and approximately 1 to $1\frac{1}{4}$ inches in thickness, at its lateral edge portions, with the cushioning article comprising lateral rolled edge portions of the sheet like stock material and which are joined generally centrally of the pad-like cushioning article lengthwise thereof, by transversely extending coined portions of the pad like article, and with the article possessing a density of approximately one pound per cubic foot.

The relatively narrow and small size pad like cushioning article is especially useful in the packaging of small parts, and is adapted for use in other cushioning situations wherein larger size pad-like cushioning product is not suitable or readily adaptable. The converter mechanism or machine from which the narrow width cushioning article of the present invention is produced, may be generally similar to that disclosed in the aforementioned prior U.S. Pat. No. 4,750,896, except that such converter mechanism has been revamped by means of the conversion kit of this invention, for production of the narrower and smaller size of cushioning dunnage pad product, and as will be hereinafter discussed in detail. The aforementioned conversion kit of this invention comprises a funnel-like chute member and an elongated bar-like former member which is adapted to coact with the chute member in a generally known but revamped type of converter mechanism of the general type for instance of aforementioned U.S. Pat. No. 4,750,896 together with utilization of a shorter width of multi-ply stock roll, to provide for the production of the narrower width and smaller size cushioning dunnage pad-like product of this invention.

Accordingly, an object of this invention is to provide a novel, relatively small size and narrow width cushioning dunnage product of pad-like form, for use as packing material and the like, especially useful in the packaging of small parts.

Another object of the invention is to provide a conversion kit which includes a funnel-like chute member and an elongated bar-like former member which is adapted for removable installation in a known type of converter mechanism, for enabling production of the aforementioned smaller size and narrow width cushioning dunnage product, utilizing the generally known type of converter mechanism, but as revamped by the conversion kit apparatus.

A still further object of the invention is to provide a conversion kit of the aforementioned type which includes a funnel-like chute member and a coacting elongated bar-like former member, which can be utilized in the field to convert a known dunnage producing converter mechanism, which conventionally produces full size cushioning dunnage product in pad-like form, into one that produces the relatively small size, narrow width cushioning dunnage product of the invention.

A still further object of the invention is to provide a novel method for the production of pad-like cushioning dunnage product of relatively small size and narrow width, which can be expeditiously utilized in the packaging of small parts, and for other cushioning uses for which larger or full size size cushioning dunnage pad product produced on a cushioning dunnage converter of known type, is not readily adaptable for.

Other objects and advantages of the invention will be apparent from the following description taken in conjunction with the accompanying drawings herein.

DESCRIPTION OF PREFERRED EMBODIMENT

Figure 1:
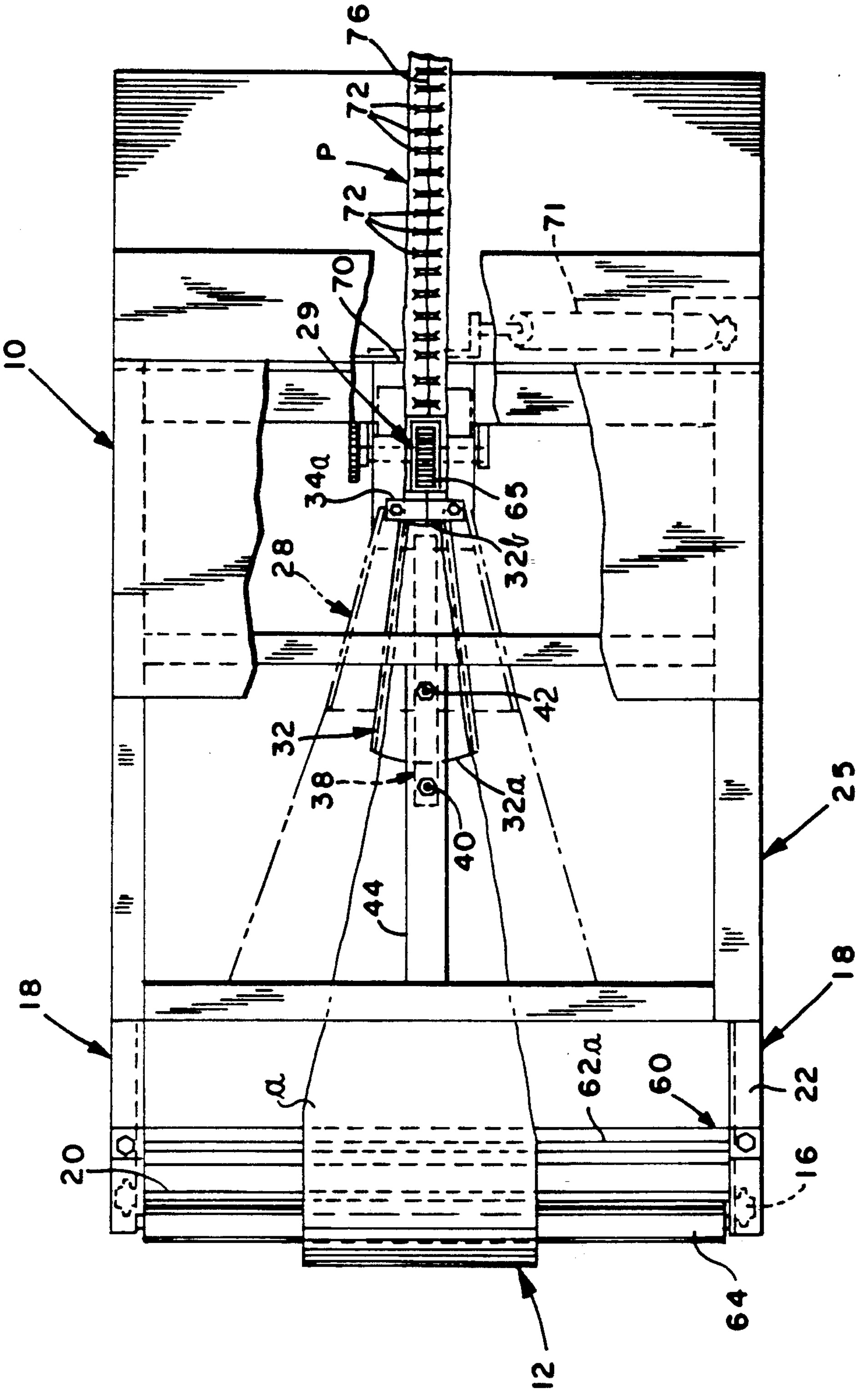
FIG. 1 is a broken, partially sectioned, top plan view of a known dunnage converter mechanism which has been revamped by use of the conversion kit of the present invention, into a dunnage converter capable of producing the relatively narrow small size pad like cushioning dunnage product of the invention.

Referring now again to the drawings, there is illustrated a dunnage producing machine 10 which is adapted to utilize a single, multi-ply stock roll 12 of sheet like stock material (such as for instance 3 sheets of 30 pound kraft paper) which are rolled into single roll form. In the embodiment of stock roll illustrated in FIGS. 1 and 2, the plies of the stock roll are of equal width and comprise 3 plies disposed in roll form, for rotatable installation on the dunnage producing converter mechanism 10.

The stock roll 12, in the machine embodiment illustrated, is approximately 15 inches in width, (i.e., in a direction transverse of machine 10) as compared to a conventional stock roll of approximately 30 inch width, as conventionally used on dunnage converter mechanism of the general type illustrated and described for instance in aforementioned U.S. Pat. No. 4,750,896.

Stock roll 12 in this embodiment, comprises a hollow core 14 (FIG. 4) of generally cylindrical tubular configuration on which the three superimposed webs or sheets of paper stock material are wound. Stock roll 12 is adapted to be mounted on a supporting rod 16 extending relatively loosely through the core 14 of the roll, for rotation of the stock roll 12 and core 14 relative to the supporting bracket framework structure 18 of the converter machine 10. As the stock material is drawn from the roll 12 into the dunnage converter machine 10, the roll 12 rotates in a clockwise direction as viewed in FIG. 2.

In order to position the lesser width stock roll 12 on the supporting rod 16 generally centrally of the longitudinal axis of the dunnage converter machine, a pair of sleeves 20 are slipped over the respective end of the stock roll supporting rod 16 and extend from the corresponding end of the stock roll to the respective arm 22 of each supporting bracket 18 for the stock roll. Thus, it will be seen that the stock roll can rotate with respect to supporting rod 16, and yet cannot move any great amount laterally to either side of the longitudinal axis of the dunnage converter machine during operation of the converter to produce the narrow width small size dunnage pad product P, formed from the webs or plies, a, b, and c (FIG. 2) of the sheet like stock material.

Aforementioned supporting brackets 18 in the embodiment illustrated, comprise laterally spaced brackets of generally U-shape in side elevation (FIG. 2) with the U being turned on its side and with the aforementioned lower leg 22 of the bracket structure at each respective side of the converter machine comprising a recess 24 in which the respective end of the roll supporting rod 16 is disposed. As an example of the size of roll 12 of stock material mounted on the converter, the roll may be and preferably is of approximately 12 to 14 inches in diameter or larger.

Figure 2:
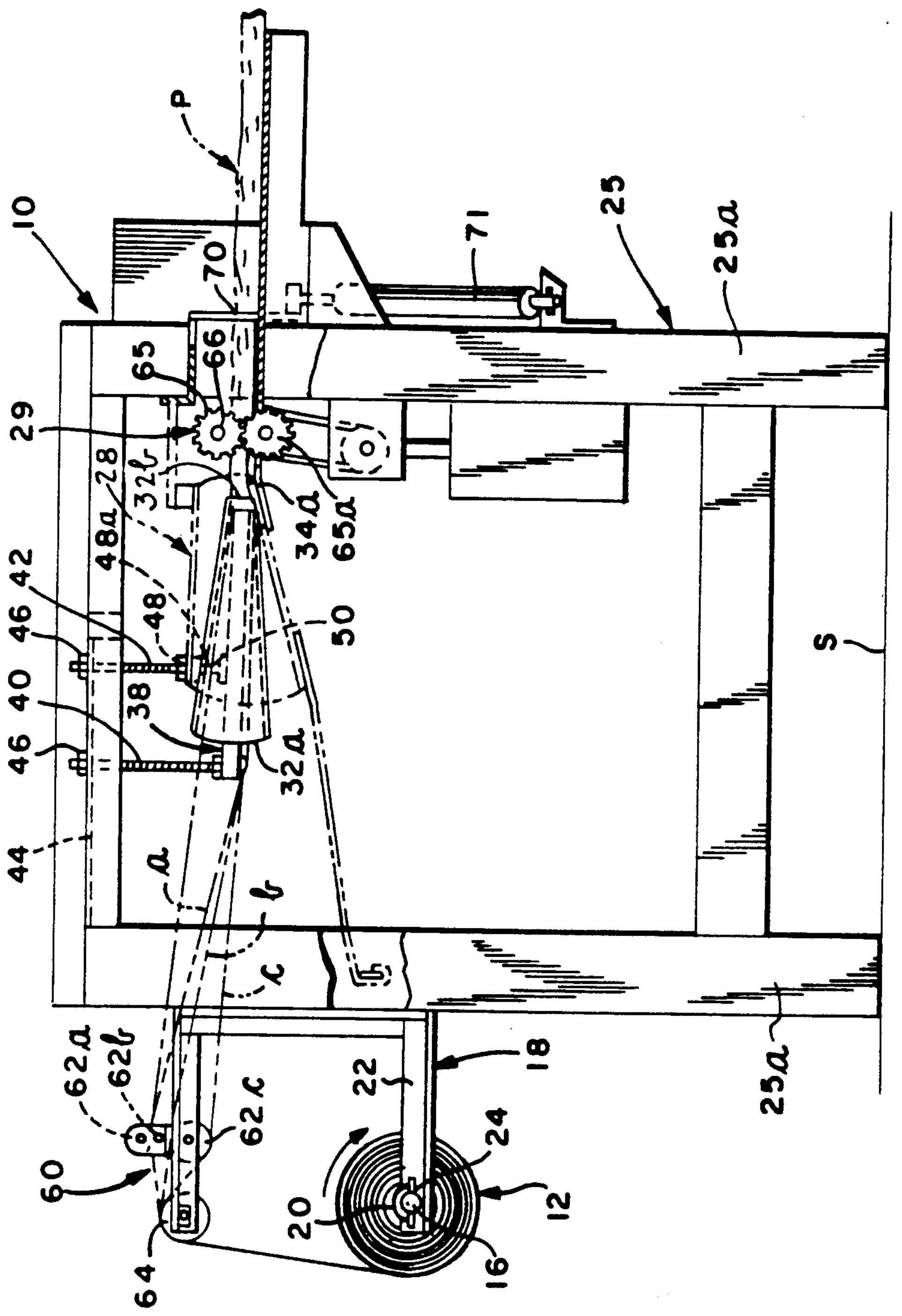
FIG. 2 is a partially sectioned, side elevational view of the mechanism of FIG. 1.

The machine 10, in the embodiment illustrated, comprises a frame 25 including leg portions 25*a*, which may include adjustable means (not shown) associated therewith, for providing for leveling of the dunnage converter mechanism with respect to the supporting surface S (FIG. 2).

Frame 25 conventionally supports a longitudinally converging chute member 28 (FIGS. 1 and 2) which is shown in phantom lines, for facilitating the illustration, and through which the stock material from the stock roll is conventionally adapted to pass in a known manner as it is drawn off the stock roll and passed through the connecting mechanism section 29 of the known converter mechanism. Such known converter mechanism also conventionally includes a three dimensional forming frame of triangular configuration in plan, which coacts with chute 28. This conventional forming frame (not shown) has to be first removed from the converter machine 10, in order to install the funnel-like chute and bar former conversion kit of this invention. Reference may be had to aforementioned U.S. Pat. No. 4,750,896 for a detailed explanation of the usual operation of conventional chute member 28 and forming frame and connecting mechanism 29 in the converter mechanism. However, chute member 28 is likewise not used in the revamped converter mechanism of this invention, to produce the narrow width and small size dunnage pad product of this invention. Chute 28 can, however, be either left on the converter, or removed from the converter as revamped for the production of the narrow width small size cushioning dunnage product, P, and as will be hereinafter discussed in greater detail.

In accordance with this invention, a conversion kit 30 is provided for converting the known dunnage converter machines of, for instance, the type illustrated in aforementioned U.S. Pat. No. 4,750,896, to the type of the invention, capable of producing the relatively narrow, small size cushioning dunnage pad product P of the invention.

Figure 3:
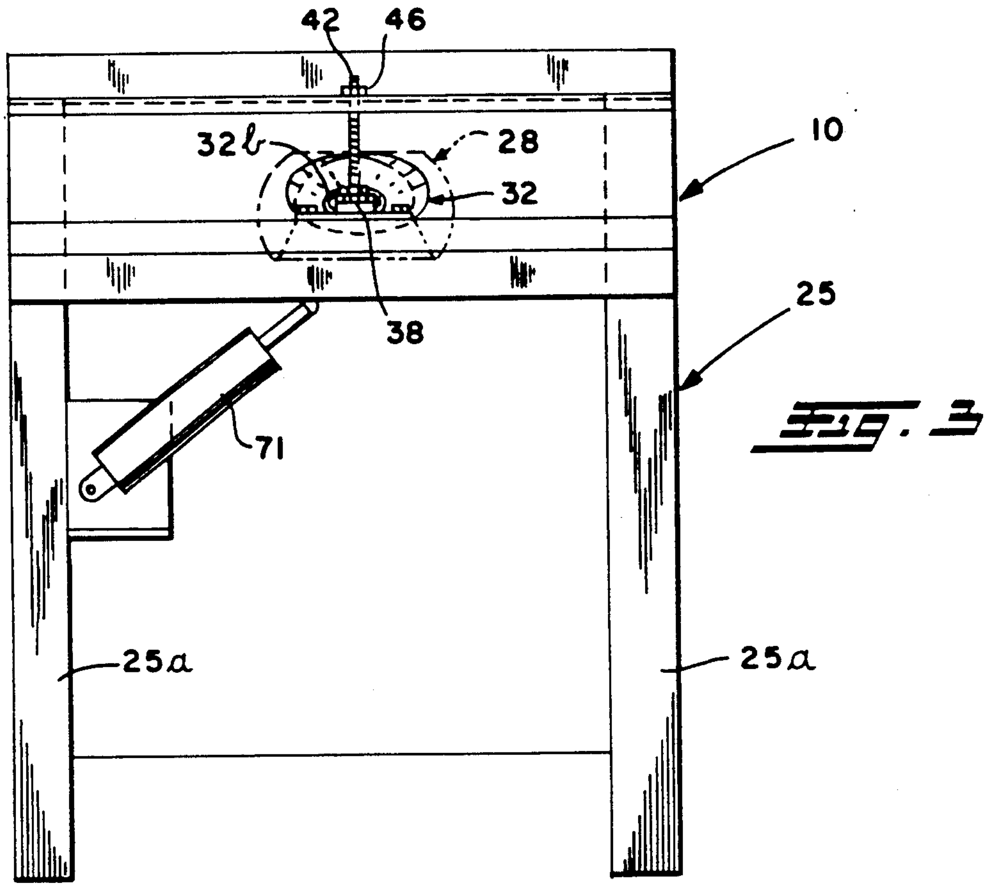
FIG. 3 is a partially broken, end elevational view of the mechanism of FIGS. 1 and 2, taken from the right hand or product exit end thereof.
Figure 4:
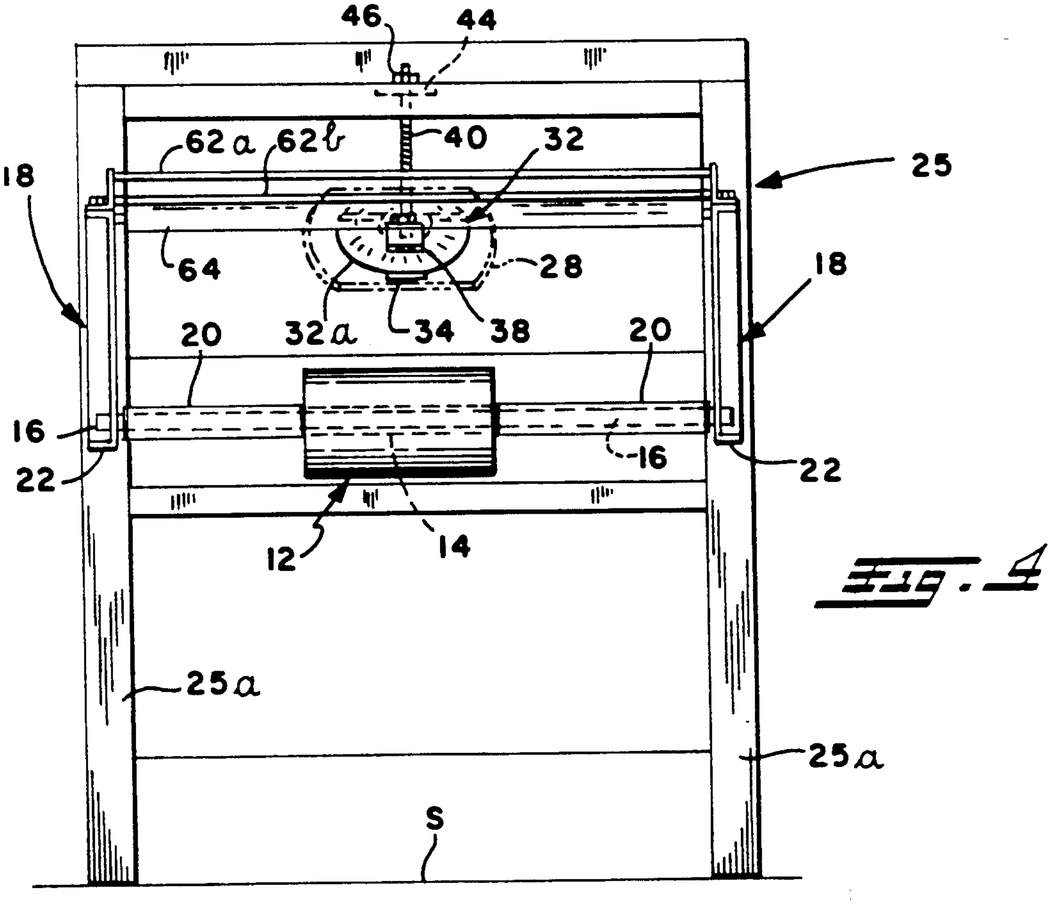
FIG. 4 is an end elevational view of the mechanism of FIGS. 1 and 2 taken from the left hand or stock material entry end thereof.
Figure 6:
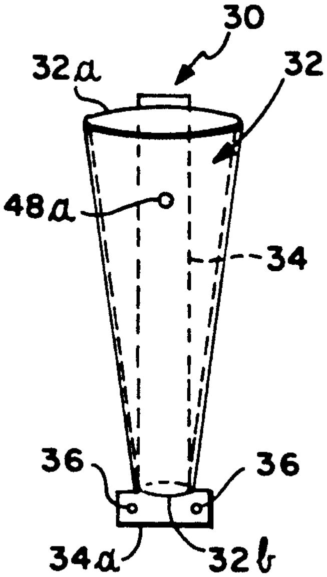
FIG. 6 is a top plan view of the funnel-like chute member of the conversion kit of the invention, which is adapted for installation into a known converter mechanism for revamping it to produce the relatively narrow small size cushioning dunnage product of the invention.
Figure 7:
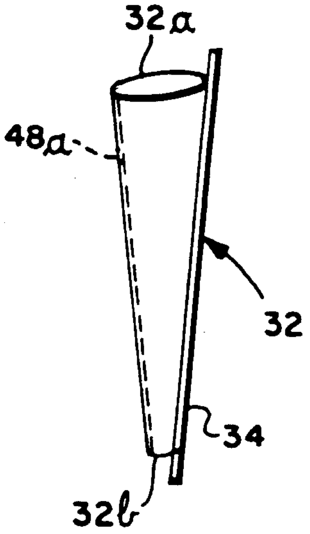
FIG. 7 is a side elevational view of the funnel member of FIG. 6, taken from the right hand side thereof.

The converter kit 30 (FIG. 6, 7 and 8) comprises an elongated funnel like chute member 32 (FIG. 6 and 7) which includes a widened generally oval shaped entrance end 32*a* and a relatively narrower exit end 32*b*, again of generally oval shape, with the horizontal axis of each oval being of a greater dimension as compared to the vertical axis of the respective oval, and as can be readily seen from FIGS. 3 and 4 of the patent application drawings.

Funnel chute member 32 preferably has an elongated support strip 34 secured to the underside of the chute member and having a widened head portion 34*a*, with means, such as openings 36 therein, for conventionally securing the funnel-like chute member 32 in position, interiorly of the aforementioned converging member 28 of the known converter mechanism, and as illustrated in FIGS. 1 and 2 of the patent application drawings. For instance, fastener means (e.g., bolts or screws) can be passed through the aforementioned openings 36 in the head portion 34*a* of strip 34 and fix the funnel-like chute member 32 in position to frame 25, so that the exit end 32*b* thereof is disposed generally adjacent the exit end of the chute member 28 (when the latter has not been removed from the converter machine), just upstream from the connecting mechanism 29 of the converter machine, which connecting mechanism will be hereinafter described.

The conversion kit 30 also includes an elongated bar like former member 38 (FIGS. 1, 2 and 8) which is received interiorly of the funnel-like chute member 32 with the downstream end of the former member 38 being disposed relatively closely adjacent the exit end 32*b* of the chute 32 (preferably about 1½ inches from the end 32*b*) and with the upstream end of the former member 38 extending rearwardly out of the entrance end 32*a* of the chute 32, and as best shown in FIGS. 1 and 2. Elongated support rods 40, 42 support the former member 38 in position in the chute 32 with the rods 40, 42 being supported on rib 44 of the frame 25 of the converter mechanism. Support rods 40, 42, may be threaded and provided with coacting nuts 46 which enable vertical adjustment thereof and thus adjustment of the angular position of the former with respect to the horizontal and with respect to the coacting funnel-like chute member 32.

The forward support rod 42 passes through a formed opening 48 in the conventional converging chute member 28 (if the latter is left in the converter mechanism 10—FIG. 2) and also through an aligned opening 48*a* in the auxiliary chute member 32, to be received in secured relationship to the former member 38. Thus, it will seen that the bar-like former member 38 is more or less generally rigidly held in position interiorly of the chute 32, with the downstream end of the former member 38 being disposed close to the exit end 32*b* of the chute 32 and occupying the major portion of the transverse dimension of the exit end of chute 32 between the interior defining surfaces thereof. As a preferred example, the major axis of the oval exit end 32*b* of chute 32 may be of approximately three inches in dimension, while the minor axis may be approximately 1 inch, while the bar-like former member may be and preferably is approximately 2 inches wide by approximately 1 inch in thickness. The downstream end of the bar former is adapted to engage the superimposed plies of stock material in generally tensioned condition as the plies are pulled by the connecting means 29 past the bar former and out of exit 32*b* of the chute 32. The corners of the bar former at said downstream end may be broken to aid in preventing tearing of the plies of stock material. Nuts 50 on forward support rod also coact with chute 32 to support the latter in position in the converter mechanism.

Figure 8:
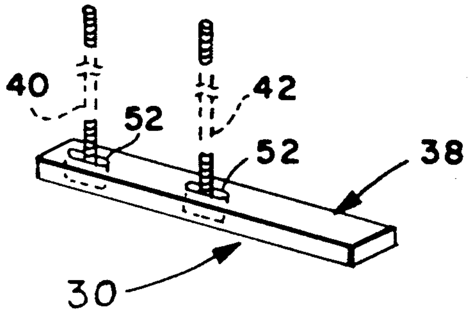
FIG. 8 is a generally perspective illustration of the elongated bar like former member which is adapted for coaction with the funnel chute member of the conversion kit, when installed in a known converter mechanism; the supporting rods for the former member are shown in broken phantom lines.
Figure 9:
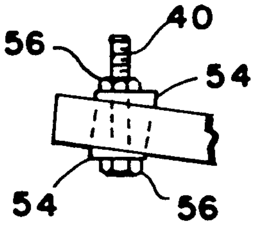
FIG. 9 is a fragmentary, side elevational view of the rearward end portion of the former member of FIG. 8 illustrating the use of slant washers with the associated support rod, for aiding in positioning of the former member in the converter mechanism.

As illustrated in detail in FIGS. 8 and 9, the former member 38 may include elongated through slots 52 therein through which extend the respective support rod 40, 42, thus providing for some lengthwise adjustment of the position of the former member relative to the exit end of coacting chute 32. Also, as shown in FIG. 9, slant washers 54 may be used in conjunction with nuts 56 on the support rods (both forward and rearward) for releasibly securing the lengthwise position of the former member 38 relative to chute 32, and in angular relation to the horizontal. The downstream end of the former bar is preferably positioned about ¼ inch from the defining bottom surface of the chute, while the vertical distance between the underside of the bar former and the bottom surface of the chute 32 at the entrance end 32*a* thereof is preferably about one and one-fourth inches.

The separating mechanism 60 which is at the forward end of the converter machine receives the plies or webs of sheet like stock material from the multi-ply stock roll 12, and separates the plies into individual plies or webs of stock material, prior to their passing beneath the bar former member 38 and into the funnel-like chute member 32. Separating means 60 comprises a plurality of preferably rotatable bar like elements **62*a*, 62*b* and 62*c* about which is adapted to pass a respective web of the stock material from the rotatable stock roll 12. Also disposed outwardly from the separating mechanism 60 and supported on the upper arms of the bracket 18 is a further bar-like member 64 which in the embodiment illustrated is a rotatable roller mounted at its ends on the spaced upper arms of U brackets 18. Roller 64 provides a non varying point of entry of the plies of sheet like stock material from the stock roll as they are pulled into the dunnage producing mechanism toward the connecting means 29 irrespective of the diameter of the stock roll, which of course, continually varies as it is used up. Reference may be had to the aforementioned U.S. Pat. No. 4,750,896 for a more detailed description and explanation of the operation of the separating mechanism on associated constant entry roller 64**.

Connecting mechanism 29, in the embodiment illustrated comprises generally loosely meshed vertically arranged gear-like or meshing tooth members 65, **65*a* which are rotatably mounted by means of a respective shaft. Shaft 66 of the upper gear 65 is preferably arranged with the end of the shaft being mounted in slatted bracket frames (not shown) on frame 25, with springs being provided coacting with the respective end of the shaft to urge the shaft 66 and associated gear 65 downwardly toward the underlying gear member 65*a***, thus providing a somewhat floating but downwardly biased support for the top gear. Such an arrangement provides for automatically varying the spacing between the gear teeth in the event of varying amounts or thickness of stock material attempting to pass between the gears during the connecting operation. The coining gears in known converter mechanisms of this type and the type of aforementioned U.S. Pat. No. 4,750,896 are about $1\frac{1}{2}$ inches in width, and thus the major portion of the produced relatively narrow pad-like product is compressed in a direction transverse of the produced dunnage pad as the coining operation proceeds.

Reference may be had to aforementioned U.S. Pat. No. 4,750,896 which is incorporated herein by reference, for a more detailed description of the basic structural arrangement of the converter machine, and means for driving the rotatable connecting means 29 thereof.

Disposed downstream from the rotatable gear connecting means 29 is a tunnel member 68 on the known converter machine and through which the narrow pad-like product produced by the converter machine passes as it is emitted from the connecting means 29 prior to emission of the pad-like cushioning dunnage product through the exit opening 70 in the converter mechanism. Powered cutter means 71 is preferably provided for severing the pad-like product into selected lengths as it is emitted from the converter, and in the usual manner.

Figure 5:
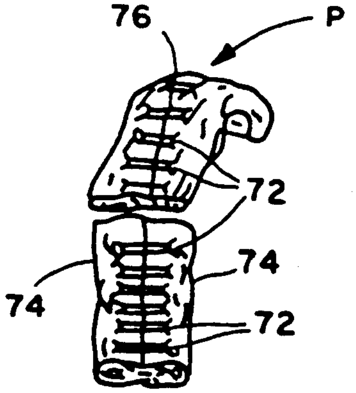
FIG. 5 is a broken, fragmentary, end and perspective illustration of the relatively narrow small size pad like dunnage product produced on the revamped dunnage producing converter mechanism of FIGS. 1–4.

As the sheet like stock material from roll 12 is passed through the funnel-like chute member 32, the inwardly rolled edges of the stock material are disposed in generally lateral, abutting relationship, as they emerge from the exit end **32*b* of the chute and then they are compressed or "coined" and joined together as aforementioned, by the geared connecting mechanism 29, resulting in spaced, coined connecting sections 72 spaced lengthwise of the produced dunnage pad P, and as illustrated in FIG. 5. The lateral exterior edge portions 74 of the pad are of generally non-compressed or non-coined condition, and thus have a somewhat greater resiliency or "give" as compared to the central compressed section 76 of the pad, and may be of between approximately one to one and a quarter inch thickness. The central generally compressed section 76 of the pad extends for the major portion of the transverse width of the pad, with only relatively small areas being provided on the lateral edges of the pad that are in the aforedescribed non-compressed condition. As the pad exits from the exit opening in the dunnage converter, it passes by the aforementioned cutter mechanism 71** which when actuated by a workman, severs the produced pad-like dunnage product into selected lengths for use as packing, edge cushioning, furniture wrapping, or the like.

From the foregoing description and accompanying drawings, it will be seen that the invention provides a novel converter mechanism which has been adapted from producing full size pad like dunnage product, to one that produces relatively narrow width small size cushioning dunnage product from sheet like stock material, such as for instance paper, and wherein the converter mechanism has been expeditiously revamped by means of a conversion kit comprising a funnel-like chute member and a coacting elongated bar like former member, which operate to cause inward rolling of the lateral edges of the sheet like stock material as it is pulled from a multi-ply stock roll, after which the rolled edge stock material passes through a connector or "coining" means, wherein the abutting lateral rolled edge portions are connected together, to hold the produced narrow width pad-like dunnage product in its pad like form.

The invention also provides a novel arrangement of produced dunnage product in pad like form which is of a relatively narrower width and small size as compared to full size dunnage pad product produced on known dunnage converter mechanism, and which is especially adapted for use in the packaging of small parts and for cushioning edges and parts of articles such as furniture or the like, during the shipment thereof.

The invention also provides a novel method for the production of relatively narrow pad like dunnage product by utilization of a bar like former member which occupies the major portion of the transverse dimensional space between the interior surfaces defining the exit end of an associated funnel-like chute member so that the webs or plies of stock material being pulled from the stock roll are forced into the limited unobstructed areas between the downstream end of the former member and the interior defining surfaces of the exit end of the funnel-like chute member, thus producing the relatively narrow small size dunnage pad like product.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

I claim:

1. A resilient narrow width cushioning product comprising a deformable pad article for packaging of small parts or protecting edges of products to be packaged which is machine formed from sheet material, such as for instance paper, the lateral edges of which have initially been rolled inwardly toward one another into generally abutting relationship, said article including means comprising transversely extending coined portions of said article spaced relative to one another lengthwise of said article, and connecting non-coined lateral rolled edge portions of said article together, said coined portions extending transversely of said article toward opposite sides of the lengthwise axis of said article, for a major portion of the transverse dimension of said article, but terminating adjacent said lateral non-coined edge portions, said article possessing a density of approximately one pound per cubic foot, and being between approximately three and one-half inches to approximately four inches in width and having a thickness of approximately one to one and one-fourth inches at said non-coined edge portions and a lesser thickness at said coined portions.

2. A product in accordance with claim 1 wherein said article is formed of three individual webs of paper sheet material disposed in generally superimposed relation prior to said inward rolling of the lateral edges of said webs.

3. A product in accordance with claim 2 wherein each of said webs consists of 30 pound kraft paper of approximately 15 inches in width, with said superimposed webs being disposed in roll form prior to said inward rolling of the lateral edges thereof.

4. A product in accordance with claim 1 wherein the central coined section of said article in lengthwise direction thereof has a greater density of sheet material as compared to the lateral non-coined edge portions of the pad.

* * * * *